US010011149B2

(12) United States Patent
Dry

(10) Patent No.: US 10,011,149 B2
(45) Date of Patent: *Jul. 3, 2018

(54) SELF-REPAIRING INFLATABLE ARTICLES

(71) Applicant: Carolyn M. Dry, Winona, MN (US)

(72) Inventor: Carolyn M. Dry, Winona, MN (US)

(*) Notice: Subject to any disclaimer, the term of this patent is extended or adjusted under 35 U.S.C. 154(b) by 800 days.

This patent is subject to a terminal disclaimer.

(21) Appl. No.: 14/531,763

(22) Filed: Nov. 3, 2014

(65) Prior Publication Data
US 2015/0056391 A1 Feb. 26, 2015

Related U.S. Application Data

(63) Continuation of application No. 14/189,698, filed on Feb. 25, 2014, now Pat. No. 8,877,309, which is a continuation of application No. 13/781,251, filed on Feb. 28, 2013, now Pat. No. 8,685,513.

(60) Provisional application No. 61/634,483, filed on Feb. 29, 2012.

(51) Int. Cl.
| B29D 22/00 | (2006.01) |
| B60C 19/12 | (2006.01) |
| B29C 73/16 | (2006.01) |
| B29C 73/22 | (2006.01) |
| B32B 1/00 | (2006.01) |
| B32B 15/085 | (2006.01) |
| B32B 15/09 | (2006.01) |

(52) U.S. Cl.
CPC ............ B60C 19/12 (2013.01); B29C 73/163 (2013.01); B29C 73/22 (2013.01); B32B 1/00 (2013.01); B32B 15/085 (2013.01); B32B 15/09 (2013.01); B60C 19/122 (2013.01); B60C 19/125 (2013.01); B60C 19/127 (2013.01); *B32B 2250/03* (2013.01); *B32B 2307/762* (2013.01); *B60C 2200/12* (2013.01); *Y10S 428/912* (2013.01); *Y10T 152/10675* (2015.01); *Y10T 152/10684* (2015.01); *Y10T 152/10693* (2015.01); *Y10T 152/10702* (2015.01); *Y10T 152/10711* (2015.01); *Y10T 428/1355* (2015.01); *Y10T 428/1359* (2015.01)

(58) Field of Classification Search
CPC ..... B60C 19/12; B60C 19/122; B60C 19/127; B60C 19/125; B60C 2200/12; B32B 15/09; B32B 15/085; B32B 1/00; B32B 2250/03; B32B 2307/762; B29C 73/163; B29C 73/22; Y10T 428/1359; Y10T 428/1355; Y10T 152/10693; Y10T 152/10675; Y10T 152/10684; Y10T 152/10702; Y10T 152/10711; Y10S 428/912

See application file for complete search history.

(56) References Cited

U.S. PATENT DOCUMENTS

| 1,959,460 | A |   | 5/1934  | Crossan |
| 1,977,281 | A |   | 10/1934 | Knowlton |
| 2,782,829 | A |   | 2/1957  | Peterson et al. |
| 2,877,819 | A |   | 3/1959  | Gibbs |
| 3,048,509 | A |   | 8/1962  | Sweet et al. |
| 3,297,667 | A |   | 1/1967  | Von Dohlen et al. |
| 3,444,918 | A |   | 5/1969  | Goggins |
| 3,541,063 | A |   | 11/1970 | Throckmorton et al. |
| 3,794,604 | A |   | 2/1974  | Throckmorton et al. |
| 3,910,334 | A |   | 10/1975 | Gardner |
| 3,930,526 | A |   | 1/1976  | Edwards |
| 3,935,893 | A |   | 2/1976  | Stang et al. |
| 4,057,090 | A |   | 11/1977 | Hoshikawa et al. |
| 4,093,014 | A | * | 6/1978  | Tomoda .................. B60C 15/06 152/542 |
| 4,095,638 | A |   | 6/1978  | Thompson et al. |
| 4,101,494 | A |   | 7/1978  | Kent et al. |
| 4,113,799 | A | * | 9/1978  | Van Ornum .......... B29C 73/163 152/504 |
| 4,149,579 | A |   | 4/1979  | Senger |
| 4,171,237 | A |   | 10/1979 | Bohm et al. |
| 4,262,624 | A |   | 4/1981  | Soeda et al. |
| 4,286,643 | A |   | 9/1981  | Chemizard et al. |
| 4,388,261 | A |   | 6/1983  | Codispoti et al. |
| 4,445,562 | A |   | 5/1984  | Bohm et al. |
| 4,919,183 | A |   | 4/1990  | Dobson |
| 4,978,563 | A |   | 12/1990 | Sandels |
| 5,238,893 | A |   | 8/1993  | Hergenrother et al. |
| 5,274,106 | A |   | 12/1993 | Lawson et al. |
| 5,329,005 | A |   | 7/1994  | Lawson et al. |
| 5,332,810 | A |   | 7/1994  | Lawson et al. |

(Continued)

FOREIGN PATENT DOCUMENTS

| EP |        1270188 A1 * | 1/2003 | ........... B29C 73/163 |
| WO | WO-93/16890 | 9/1993 | |
| WO | WO-95/09034 | 4/1995 | |

OTHER PUBLICATIONS

Berg, T., "Goodyear DuraSeal Tires Heal Themselves," Feb. 28, 2005, Construction Equipment Website: http://www.constuctionequipment.com/goodyear-duraseal-tires-heal-themselves, 2 pages.

Dhoot, S.N., et al., "Barrier Polymers," Encyclopedia of Polymer Science and Technology, 2002, pp. 248.

Non-final Office Action received for U.S. Appl. No. 13/781,251 dated Sep. 5, 2013.

OTR Wheel Engineering "Polyurethane fill solutions from the largest tire foam filler in North America," Tire Flat-Proofing Solutions Brochure, 2010, 4 pages.

(Continued)

*Primary Examiner* — James C Yager
(74) *Attorney, Agent, or Firm* — Foley & Lardner LLP

(57) ABSTRACT

A self-repairing inflatable article including an inflatable component that includes an interior surface and an exterior surface, a sealed flexible package adjacent to the inflatable component, and a sealant composition disposed in the sealed flexible package. The sealed flexible package is configured to release the sealant composition upon puncture, tearing or other breach of the inflatable component.

25 Claims, No Drawings

(56) References Cited

U.S. PATENT DOCUMENTS

| | | | |
|---|---|---|---|
| 5,393,721 A | 2/1995 | Kitamura et al. |
| 5,491,230 A | 2/1996 | Lawson et al. |
| 5,496,940 A | 3/1996 | Lawson et al. |
| 5,521,309 A | 5/1996 | Antkowiak et al. |
| 5,523,364 A | 6/1996 | Engel et al. |
| 5,527,753 A | 6/1996 | Engel et al. |
| 5,530,037 A | 6/1996 | McDonnell et al. |
| 5,550,203 A | 8/1996 | Engel et al. |
| 5,556,488 A | 9/1996 | Gergele et al. |
| 5,561,173 A | 10/1996 | Dry |
| 5,574,109 A | 11/1996 | Lawson et al. |
| 5,575,841 A | 11/1996 | Dry |
| 5,578,542 A | 11/1996 | Lawson et al. |
| 5,735,083 A | 4/1998 | Brown et al. |
| 5,925,713 A | 7/1999 | Labauze |
| 5,957,494 A | 9/1999 | Yahiaoui |
| 6,013,718 A | 1/2000 | Cabioch et al. |
| 6,182,398 B1 | 2/2001 | Head |
| 6,211,278 B1 | 4/2001 | Vanel |
| 6,261,360 B1 | 7/2001 | Dry |
| 6,362,253 B1 | 3/2002 | Durel |
| 6,527,849 B2 | 3/2003 | Dry |
| 6,539,994 B1 | 4/2003 | Ruffa |
| 6,642,337 B1 | 11/2003 | Misiak et al. |
| 6,915,826 B2 | 7/2005 | Poling et al. |
| 7,022,179 B1 | 4/2006 | Dry |
| 7,037,395 B2 | 5/2006 | Saito |
| 7,044,166 B1 | 5/2006 | Monk et al. |
| 7,569,625 B2 | 8/2009 | Keller et al. |
| 7,588,064 B2 | 9/2009 | Saito |
| 7,607,466 B2 | 10/2009 | Kim et al. |
| 7,811,666 B2 | 10/2010 | Dry |
| 8,221,573 B2 | 7/2012 | Lammlein, Jr. |
| 2001/0050032 A1 | 12/2001 | Dry |
| 2002/0121325 A1 | 9/2002 | Albrecht |
| 2002/0162584 A1* | 11/2002 | Berman ............ B08B 9/093 134/166 R |
| 2004/0007784 A1 | 1/2004 | Skipor et al. |
| 2004/0055686 A1 | 3/2004 | Cowger et al. |
| 2004/0092648 A1 | 5/2004 | Jones et al. |
| 2005/0027078 A1 | 2/2005 | Scheifers et al. |
| 2005/0250878 A1 | 11/2005 | Moore et al. |
| 2006/0169180 A1 | 8/2006 | Dry |
| 2006/0252852 A1 | 11/2006 | Braun et al. |
| 2007/0087198 A1 | 4/2007 | Dry |
| 2007/0149653 A1* | 6/2007 | Sugio ............ B29C 73/163 523/334 |
| 2007/0225405 A1 | 9/2007 | Cegelski et al. |
| 2007/0282059 A1 | 12/2007 | Keller et al. |
| 2008/0021149 A1 | 1/2008 | Jones et al. |
| 2008/0173382 A1 | 7/2008 | Gobinath et al. |
| 2008/0264549 A1 | 10/2008 | Shih |
| 2009/0036568 A1 | 2/2009 | Merle et al. |
| 2009/0078352 A1 | 3/2009 | Majumdar et al. |
| 2009/0191402 A1 | 7/2009 | Beiermann et al. |
| 2011/0318562 A1 | 12/2011 | Dry |
| 2012/0118464 A1 | 5/2012 | Ruegg, Jr. |

OTHER PUBLICATIONS

U.S. Notice of Allowance received for U.S. Appl. No. 14/189,698 dated Aug. 13, 2014.

U.S. Notice of Allowance received for U.S. Appl. No. 13/781,251 dated Jan. 29, 2014.

* cited by examiner

SELF-REPAIRING INFLATABLE ARTICLES

CROSS-REFERENCE TO RELATED APPLICATIONS

This application is a continuation of U.S. non-provisional application Ser. No. 14/189,698 filed on Feb. 25, 2014, which is a continuation of U.S. non-provisional application Ser. No. 13/781,251 filed on Feb. 28, 2013 (Now U.S. Pat. No. 8,685,513; granted Apr. 1, 2014), which claims the benefit of priority to U.S. Provisional Application No. 61/634,483, filed Feb. 29, 2012, the entire contents of which are incorporated by reference herein and for all purposes.

SUMMARY

The present technology provides self-repairing (i.e., self-sealing) inflatable articles such as tires, inflatable rafts and boats, air beams, sports balls, and the like. The self-sealing inflatable articles include an inflatable component comprising an interior surface and an exterior surface; a sealed flexible package adjacent to at least one of the interior surface or the exterior surface of the inflatable component, and a sealant composition disposed in the sealed flexible package. Such articles are configured to release the sealant composition upon puncture of the inflatable component and the flexible package. The seal formed from the sealant composition in the inflatable article is sufficiently air impermeable to allow the article to be used for its intended purpose.

In some embodiments, the sealed flexible package includes two or more sealed cells, the flexible package being adapted for used with an inflatable article. In such embodiments, each cell of the sealed flexible package includes a first sheet with one or more edges; a second sheet with one or more edges; a sealant composition disposed between the first and second sheets; and the first and second sheets sealed to each other at the one or more edges, wherein each sheet comprises a polymer.

The foregoing summary is illustrative only and is not intended to be in any way limiting. In addition to the illustrative aspects, embodiments, and features described above, further aspects, embodiments, and features will become apparent by the detailed description.

DETAILED DESCRIPTION

The present technology provides self-repairing inflatable articles that can self-seal after being punctured while inflated. "Puncture" as used herein refers to any breach in the inflated article that allows for unintended loss of gas (e.g., air, nitrogen, carbon dioxide, helium, oxygen, inert gases, e.g., argon) from the article, including but not limited to formation of holes by sharp objects, rips, tears, slices etc. In one aspect of the technology, the articles include an inflatable component having an interior surface and an exterior surface. A sealed flexible package is adjacent to at least one of the interior surface or the exterior surface of the inflatable component, and a sealant composition is disposed in the sealed flexible package. The sealed flexible package is configured to release the sealant composition upon puncture of the inflatable component.

The inflatable component of the self-repairing article can be in any type of tube, balloon, bladder, or plenum. Each of these components may have any shape known in the art, e.g., linear, circular, oval, semi-circular, spherical, ovoid, arch or arch-like. Thus, the inflatable article may have a variety of forms and configurations including, e.g., tires (e.g., pneumatic tires, run flat tires, and tires for motorcycles, cars, trailers and other vehicles), inner tubes (e.g., for bike tires or other specialized vehicle tires), tire liners, sports balls, balloons (special occasion balloons, weather balloons, hot air balloons, and the like), air mattresses, inflatable rafts and boats, inflatable movie screens, inflatable toys, e.g., in the shape of animals, inflatable slides, trampolines and other amusement rides, airships, and other inflated articles (e.g., air beams, domes, air frames, and inflatable arches). The inflatable components may be used to support a structure in part or in full, such as a tent or other temporary shelter, or even a building. As such, the inflatable components are commercially available or may be manufactured using known processes, e.g., U.S. Pat. No. 4,095,638 (inner tubes), U.S. Pat. Nos. 6,182,398 and 5,735,083 (air beams), bladders for sports balls (WO 95/09034) and the like.

The inflatable component of self-repairing inflatable articles may be made of a wide variety of materials known in the art, including, natural and synthetic polymers (e.g., elastomers), in the form of films, membranes, layers, and laminates, and optionally including woven and unwoven fibers and other fillers and additives. Suitable polymers for the inflatable component include, e.g., vulcanized rubbers, thermoset polymers, thermoplastic elastomers and combinations thereof. Examples of useful polymers include nylons, polyamides, polyesters, polyethylenes, rubber (e.g., natural rubber, styrene-butadiene rubber, butadiene rubber, styrene-isoprene rubber, styrene-isoprene-butadiene rubber, polyvinylalcohol, acrylonitrile-butadiene rubber, polychloroprene (also known as neoprene), polyisoprene (e.g., cis-1,4-polyisoprene), nitrile rubber, butyl rubber, halogenated butyl rubber, polysulfide rubber, and ethylene propylene diene rubber (i.e., EPDM rubber), amorphous 1,2-polybutadiene, ethylene-propylene terpolymers, styrene-butadiene-styrene block copolymer, hydrogenated styrene-butadiene-styrene block copolymer (i.e., styrene-ethylene-butene-styrene block copolymer), hydrogenated styrene-butadiene block copolymer, styrene-isoprene-styrene block copolymer, hydrogenated styrene-isoprene-styrene block copolymer (i.e., styrene-ethylene-propylene-styrene block copolymer), silicone rubber, polyurethane rubber, epichlorohydrin rubber, and combinations thereof.

The present technology provides sealed flexible packages containing a sealant composition for use in self-repairing inflatable articles. The inflatable articles may include more than one sealed flexible package and may include a plurality of such packages. The sealed flexible packages are configured for use in inflatable articles of the present technology. Thus, the sealed flexible package may be adjacent to the interior surface of the inflatable component, or may be adjacent to the exterior surface of the inflatable component. In either case the packages are configured so that when the inflatable component is punctured, the sealed flexible package will also be punctured or broken so that the sealant composition inside is released into the damaged area of the inflatable component. In some embodiments, the sealed flexible package is in direct contact with the surface of the inflatable component, while in others, one or more coatings or layers of polymer or other material is disposed between the package and the surface of the inflatable component. A sealed flexible package may be held adjacent to a surface of the inflatable component by any suitable method. Such methods may include an adhesive, or held in place by friction, compression between another component and the inflatable article, thermal weld, ultrasonic weld, vacuum sealing, mechanical mechanisms (e.g., staples, stitching, tongue and groove connectors or other male-female connectors) or a combination of any two or more of the foregoing.

The sealed flexible package may be configured with one cell per package or may include two or more sealed cells in which the sealant composition is disposed. The cells may be any suitable shape such as circular, oval, rectilinear, square, rectangular, pentagonal, hexagonal, or octagonal. Where the flexible packages include a plurality of sealed cells, they may be aligned in any pattern that permits them to release the sealant composition upon puncture of the inflatable component and the flexible package. Thus, in some embodiments, at least some of the sealed cells are aligned with each other in a first direction. For example, the flexible sealed package can be a tape with multiple sealed cells arrayed in a linear fashion along its length (such as, but not limited to rectangular cells positioned end to end). The tape optionally includes perforations to allow the tape to be readily adjusted in length by, e.g., tearing at the perforations. In others, at least some of the sealed cells are aligned with each other in a first direction and in a second direction, different from the first direction. In some embodiments, at least some of the sealed cells are positioned in an offset relationship to one another in a first direction.

The sealed flexible package used in the present technology may include a first sheet with one or more edges; a second sheet with one or more edges; and the sealant composition disposed between the first and second sheets. The first and second sheets are typically sealed to each other at the one or more edges, and each sheet includes a polymer (e.g., a polymer film). Alternatively, the sealed flexible package is formed from a single sheet folded over on itself and sealed where the edges meet. In some embodiments, at least one sheet of the sealed flexible package further comprises a metal (e.g., a foil). Thus, in some embodiments, each sheet may be a laminate comprising two or more layers. For example, each sheet may be laminate that includes a polymer layer and a metal foil layer or a metalized polymer layer with a sealant composition disposed within the package. In some embodiments, the metal layer is aluminum, tin, steel or an alloy of any one of the foregoing. In other embodiments, the laminate comprises a metal foil layer between two or three polymer layers that are the same or different, e.g., between two layers of polyethylene, between polypropylene and polyethylene or between polyester and polyethylene films. In some embodiments, the sheet is a laminate having a top layer of polyester, an adhering later of polyethylene, a metal foil such as aluminum foil and a second layer of polyethylene which forms the internal surface of the package. The laminate layers may be adhered to each other by heat, adhesive, coextrusion or a combination of such methods. In some embodiments the sealed flexible packages are generally rectangular and are sealed along all four sides. In other embodiments, the sheet is folded over on itself and sealed on three sides. Each sheet, whether a laminate or single ply film or membrane may be between about 0.5 mil and about 100 mils in thickness. Examples of sheet thickness include about 0.5, about 1, about 2, about 3, about 4, about 5, about 10, about 15, about 20, about 25, about 30, about 40, about 50, about 60, about 70, about 80, about 90, and about 100 mils, or any range between and including any two of the foregoing values. For example, the sheets may range from about 5 to about 20 mils thickness. Such sheets may be formed using methods known in the art.

The sealed flexible package may be produced by filling unsealed or partially sealed packages with the sealant composition and heat sealing, cold sealing, pressure sealing (e.g., crimping), or a combination of any two or more thereof. The flexible packages may be fabricated in a wide variety of sizes to suit the application at hand. For example, the sealed flexible packages (or cells within the packages) may be generally rectangular in shape with dimensions ranging from 0.5 cm×1 cm to 10 cm×30 cm. In some embodiments the sealed flexible packages range from 1 cm×2 cm to 5 cm×10 cm and are suitable for use in bicycle tires. Larger sealed flexible packages suitable for motorcycle, car, truck, bus and tractor tires may range from 5 cm×10 cm to 10 cm×30 cm or more, depending on the size of the tire.

Polymers that may be used in sealed flexible packages of the present technology include but are not limited to nylon, polyolefin (e.g., polyethylene, polypropylene, polybutene, polyisoprene, ethylene-propylene copolymers, ethylene-octene copolymers, propylene-butene copolymers, propylene-octene copolymers, and combinations thereof), polyester, polycarbonate, polyacrylate, polyarylate, polyamide, polyimide, polyaramide, polyurethane, cellulose (including, e.g., cellulose esters), and nitrocellulose. In some embodiments, the polymer is selected from the group consisting of polyester, polyethylene and polypropylene. Other polymers that may be used in the sealed flexible packages include rubber, ethylene vinyl acetate, polyvinyl acetate, polyvinyl butyral, polyvinyl chloride polyvinyl carbonate, and ethylene vinyl alcohol. Combinations of any two or more of the forgoing may also be used. Preferably, the polymers and/or metal layer(s) are selected such that the flexible is of very low permeability or essentially impermeable to air, moisture, and a combination thereof in order to protect the integrity of the sealant composition inside.

An interior surface of the sealed flexible package can be treated to achieve a variety of functions including, e.g., to prevent or decrease reaction of the sealant composition before it is released from the package to perform the sealing function, altering (e.g., increasing or decreasing) the surface tension of the surface of the package, altering (e.g., increasing or decreasing) the hydrophobicity or hydrophilicity of a surface of the package, altering (e.g., increasing or decreasing) the reactivity of a surface of the package to prevent premature reaction or crosslinking of the sealant composition with a component of the flexible packaging, and combinations thereof. In some embodiments, an interior surface of the sealed flexible package is treated with an acid to provide an acid-treated surface that will prevent or resist reaction with the sealant composition. Acids such as muriatic acid, maleic acid, or acetic acid may be used to produce the acid-treated surface.

The sealant composition of the present technology is a composition that, when released from the flexible sealed package, flows into the punctured area(s) of the inflatable component, and seals the inflatable component against further loss of gas (e.g., air, nitrogen, argon, carbon dioxide, helium, etc.) and preferably allows for reinflation of the component if needed. The sealant composition may be in the form of a liquid, gel, suspension, or emulsion. In some embodiments, the sealant composition not only fills the damaged area of the inflatable component, but reacts with the material of the inflatable component to more securely anchor the newly formed seal. In certain embodiments, upon release from the sealed flexible package, the sealant composition forms a gas barrier seal in less than 10 minutes, in less than five minutes, in less than four, three, two or one minute, in less than 30 seconds, in less than ten seconds, in less than 5 seconds, or even less than 3 seconds. The sealant composition can remain active after storage at room temperature for at least 6 months, at least 1 year, at least 2 years, or even at least 5 years.

The sealant composition can be formulated to maintain its sealing and repairing properties (i.e., activity) when heated or cooled to the temperatures experienced by a tire during use or during the manufacturing process for the self-repairing inflatable article. Thus, in some embodiments, the sealant composition will remain active even when heated to at least about 75° C., at least about 100° C., at least about 125° C., at least about 150° C. or even at least about 177° C. or ranges between and including any two of these values. The sealant composition preferably remains reactive and able to seal a puncture after exposure to extreme temperature and pressure conditions including, e.g., freezing weather conditions (e.g., from about −40° C. to about 5° C.) and hot weather conditions (e.g., from about 25° C. to about 60° C.) the heat and pressure experienced by a tire during use (e.g., driving (e.g., freeway driving)), desert conditions (e.g., conditions experienced by tires on military vehicles), or even temperatures of at least about 75° C. (167° F.), at least about 80° C. (176° F.), at least about 88° C. (about 190° F.), at least about 120° C. or even about 177° C. (i.e., 350° F.), and ranges between and including any two of these values.

A variety of known compounds and materials may be used in sealant compositions of the present technology. The sealant compositions may include polymerizable components (e.g., monomers, oligomers, and polymers), crosslinkable components, and combinations thereof. Useful sealant compositions include compositions that cure upon exposure to air, atmospheric moisture, and combinations thereof, and two-part sealant composition in which one part cures upon exposure to the other part and ones in which the one component softens in reaction with the other and so fills and plugs the hole and reacts with the rubber of the elastomer. In some embodiments, the sealant composition may include one or more of cyanoacrylate, one-part epoxy, polymerizable monomers, polyurethane, rubber cement, rubber latex, and vulcanizing fluid with rubber whiskers (e.g., natural rubber whiskers). In other embodiments, the sealant composition includes one or more of an acrylate, alkyl acrylate (e.g., methyl acrylate), alkyl methacrylate (e.g., methyl methacrylate), cyanoacrylate, acrylic acid, alkyl acrylic acid, olefin, lactone, lactam, styrene, isoprene, butadiene, urethane, dicyclopentadiene and epoxy. In certain embodiments, the sealant composition may include one or more of ethyl 2-cyanoacrylate, methyl 2-cyanoacrylate, n-butyl cyanoacrylate, 2-octyl cyanoacrylate, alkyl (meth)acrylate, rubber cement, and vulcanizing fluid with rubber whiskers, including natural rubber whiskers. In some embodiments, the sealant compositions include one or more silanes, siloxanes, acrylates (e.g., alkyl acrylates and alkyl(methacrylates)), cyanate esters, acrylic acids (e.g., alkyl acrylic acids), epoxies (e.g., epoxy vinyl ester, one part and two part epoxies), ethylenically unsaturated esters, polysiloxanes, olefins, lactones (e.g., caprolactone), lactams, styrenes, isoprene and butadiene, and compositions that include at least one of sulfur, peroxides, urethane crosslinkers, metal oxides, and acetoxysilanes, rubber cement, vulcanizing fluids, cyanoacrylates (e.g., methyl-2-cyanoacrylate, ethyl-2-cyanoacrylate, n-butyl cyanoacrylate, 2-octyl cyanoacrylate, bis-2-cyanoacrylate, cyanoacrylates with silicon, fluoroalkyl-2-cyanoacrylate, aryloxy ethyl-2-cyanoacrylate, cyanoacrylates with unsaturated groups, trimethylsilyl alkyl-2-cyanoacrylate, stabilized cyanoacrylate adhesives, and stabilized cyanoacrylate adhesives disclosed in U.S. Pat. No. 6,642,337 and U.S. Pat. No. 5,530,037 and incorporated herein, and combinations thereof), silanes, siloxanes, acrylates (e.g., alkyl acrylates and alkyl(methacrylates)), cyanate esters, acrylic acids (e.g., alkyl acrylic acids), epoxies (e.g., epoxy vinyl ester, one part and two part epoxies), ethylenically unsaturated esters, polysiloxanes, olefins, lactones (e.g., caprolactone), lactams, styrenes, isoprene and butadiene, and compositions that include at least one of sulfur, peroxides, urethane crosslinkers, metal oxides, and acetoxysilanes, and combinations thereof. In one embodiment, the sealant composition includes ethyl-2-cyanoacrylate, hydroquinone, and methyl methacrylate.

Epoxies that may be used in sealant compositions include, e.g., monofunctional epoxies (e.g., phenyl glycidyl ether, cresyl glycidyl ether, and glycidyl ethers of alcohols (e.g., dodecyl alcohol)), multifunctional epoxies (e.g., epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of polyhydric phenols (e.g., glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis(4-hydroxyphenyl)-propane (i.e., bisphenol A), and bis-(4-hydroxyphenyl)-methane (i.e., bisphenol F, which may contain varying amounts of 2-hydroxyphenyl isomers)), cycloaliphatic epoxy resins, epoxy novolac resins (i.e., glycidyl ethers of novolac resins), and combinations thereof.

Olefins may be used in sealant compositions include, e.g., straight chain, branched, and cyclic olefins derived from a variety of olefin monomers and oligomers including, e.g., olefin monomers containing from 2 to 20 carbon atoms (e.g., 2, 3, 4, 5, 6, 7, 8, 9, 10, 12, 14, 16, 18, 20 and ranges between/including any two of the forgoing values) and optionally containing heteroatoms. Examples include cyclic olefins such as dicyclopentadiene (DCPD), substituted DCPDs, DCPD oligomers, DCPD copolymers, norbornene, substituted norbornene, cyclooctadiene, and substituted cyclooctadiene. Useful norbornenes include, e.g., triethoxysilylnorbornene, norbornene, ethyl norbornene, propylnorbornene, butylnorbornene, hexylnorbornene, alkyl-substituted norbornene derivatives, and alkoxysilynorbornenes.

The sealant composition optionally includes conjugated diene monomers, and vinyl-substituted aromatic monomers copolymerized with at least one conjugated diene monomers. Examples of useful conjugated diene monomers include 1,3-butadiene, 2,3-dimethyl-1,3-butadiene, 2-phenyl-1,3-butadiene, 2-ethyl-1,3-butadiene, isoprene, 1,3-pentadiene, 2-methyl-1,3-pentadiene, 2,3-dimethyl-1,3-pentadiene, 3-methyl-1,3-pentadiene, 4-methyl-1,3-pentadiene, 1,3-hexadiene, 2,4-hexadiene, and 4,5-diethyl-1,3-octadiene. Examples of useful vinyl-substituted aromatic monomers include styrene, 4-methylstyrene, alpha-methylstyrene, 3,5-diethylstyrene, 4-ethylstyrene, 4-propylstyrene, 3,5-diethylstyrene, 2,4,6-trimethylstyrene, 4-dodecylstyrene, 2,3,4,5-tetraethylstyrene, 3-methyl-5-normal-hexylstyre-ne, 4-phenylstyrene, 2-ethyl-4-benzylstyrene, 3,5-diphenylstyrene, 1-vinylnaphthalene, 3-ethyl-1-vinylnaphthalene, 6-isopropyl-1-vinylnaphth-alene, 6-cyclohexyl-1-vinylnapthalene, 7-dodecyl-2-vinylnaphthalene, and combinations thereof. Other useful monomers include, e.g., cyclic ethers containing a tetrahydrofuran moiety.

For two part systems, the components of the two part system are positioned such that a first part will contact a second part when the article is punctured. The first and second parts can be located in a variety of configurations relative to the elastomeric article including, e.g., a first part contained within the sealed package and a second part present on the elastomeric article (e.g., on the interior surface of the elastomer, on a wheel rim associated with the elastomeric article, on an inner tube, and combinations thereof), a first part contained in a first cell of a sealed package that includes multiple cells and a second part in a second cell of the sealed package, a first part in the sealed package and a second part on the exterior surface of the sealed package, a first part in the sealed package and a second part on the optional additional layer associated with the sealed package, and combinations thereof. The second part can be applied to the elastomeric article using a variety of techniques including, e.g., spraying, coating, brushing, coextruding, and combinations thereof.

In some embodiments, the sealant composition may include small pieces or particles of rubber (natural and/or synthetic), other elastomers or asphalt (i.e., bitumen) in the form of, e.g., fibers, whiskers, particles (e.g., powder, granule, microparticles, microspheres, and combinations thereof), filaments, and combinations thereof. The amount of rubber, other elastomers or asphalt can range from 0% to about 75% by weight. Examples of such amounts include 0%, about 2%, about 5%, about 10%, about 15%, about 20%, about 30%, about 40%, about 50%, or about 75% by weight, or a range between and including any two of the foregoing values. In some embodiments, the sealant composition may comprise a rubber latex mixed with an adhesive and an anti-freezing agent, such as e.g., described in U.S. Patent Publication No. 20070225405, incorporated herein by reference. In some embodiments, the anti-freezing agent is ethylene glycol, propylene glycol, glycerin, or potassium acetate, or a combination of two or more thereof. In some embodiments, the antifreezing agent is glycerin, potassium acetate, or a combination of both. In certain embodiments, the ratio of the anti-freezing agent to the total weight of the puncture sealing agent composition is between about 5% and about 75% by weight. Examples of suitable weight ratios include about 5%, about 10%, about 15%, about 20%, about 25%, about 30%, about 35%, about 40%, about 45%, about 50%, about 55%, about 60%, about 65%, about 70%, about 75%, and ranges between and including any two of the foregoing values.

The self-repairing inflatable article may further include one or more additives or other materials such as catalysts, initiators, accelerators, solvents, fillers (e.g., fibers and fibrous materials that enhance the sealing capability of the sealing composition), heat-resistant agents, antioxidants, colorants, thickeners, anti-corrosion agents, surfactants, and biocides. The additives or other materials may be part of the sealant composition or may be configured to reside elsewhere in the article, e.g., on the surface of one of the other components of the article, such as the interior or exterior of the inflatable component, or the exterior of the sealed flexible package.

The article of the present technology optionally includes a catalyst capable of facilitating the polymerization of the monomer(s) in the sealant composition. Certain catalyst systems will effectively facilitate the polymerization of specific monomers, and the catalyst should be selected accordingly. Useful catalyst systems include, e.g., Grubbs ruthenium catalysts, coordination catalyst systems, lanthamide-based catalyst systems that include a lanthamide compound (e.g., a neodymium compound), an alkylating agent, and a source of halogen, examples of which are described in U.S. Pat. Nos. 3,297,667, 3,541,063, and 3,794,604 and incorporated herein. Lanthamide-based catalyst systems are useful for polymerizing conjugated diene monomers including, e.g., 1,3-butadiene monomer into cis-1,4-polybutadiene rubber. Sealant compositions that include norbornene, and substituted norbornene monomers optionally include a catalyst, e.g., a ring opening metathesis polymerization (ROMP) catalyst (e.g., a Schrock catalyst), optionally in combination with a Lewis acid, a Bronsted acid, and combinations thereof. Catalysts suitable for use in conjunction with lactones and lactams include, e.g., cyclic ester polymerization catalysts and cyclic amide polymerization catalysts (e.g., scandium triflate). In one embodiment, the sealant composition includes dicyclopentadiene, and the catalyst includes a ruthenium-based Grubb's catalyst.

The present article optionally includes, e.g., in the sealant composition, an accelerator that decreases the reaction time, i.e., increase the rate of reaction. Examples of suitable accelerators include silicon, styrene and alpha-methylstyrene, and bis-cyanoacrylate, and particles such as clay, nanoclays, montmorillite clay, carbon black, sodium hydroxide (e.g., a 50% solution of sodium hydroxide in water and pellets of sodium hydroxide), gases (e.g., ammonia), and combinations thereof. The accelerator can be present in the self-repairing inflatable article in a variety of configurations including on the exterior surface of the sealed flexible package, on the interior surface of the inflatable component, or on the exterior surface of the inflatable component.

The present articles optionally include an initiator. Useful anionic polymerization initiators include, e.g., organolithium initiators (e.g., butyllithium), functional initiators (e.g., lithium amide initiators, aminoalkyl lithium initiators, and organotin lithium initiators), and combinations thereof. Exemplary initiators are described in U.S. Pat. Nos. 5,153,159, 5,268,439, 5,274,106, 5,238,893, 5,332,810, 5,329,005, 5,578,542, 5,393,721, 5,491,230, 5,521,309, 5,496,940, 5,574,109, 5,523,364, 5,527,753, and 5,550,203 and incorporated herein. These initiators are particularly useful for synthesizing conjugated diene elastomers or copolymers of conjugated diene monomers and vinyl-substituted aromatic monomers.

The sealant composition optionally includes an organic solvent. Examples of suitable organic solvents include ethyl ether, acetone, n-heptane, n-hexane, toluene, acetone, glycerol, methyl ethyl ketone, methyl isobutyl ketone, methylene chloride, ethylene dichloride, pyridine, isooctane, chloroform, carbon tetrachloride, o-xylene, water, dimethyl sulfoxide and combinations of any two or more thereof. In some embodiments the sealant composition includes a high-boiling (e.g., boils at least about 75° C.) solvent or small amounts of low boiling solvents. In some embodiments, the sealant composition includes cold vulcanizing fluid, one or two high boiling solvents and optionally whiskers of uncured rubber. Preferably the high boiling solvent also has low flammability.

The sealant composition optionally includes fillers. Examples of suitable fillers include fibers, rubber (natural and synthetic, vulcanized and unvulcanized), metal carbonates (e.g., calcium carbonate (chalk, calcite, marl, travertine, marble and limestone)), calcium magnesium carbonate, sodium carbonate, magnesium carbonate), silica (e.g., quartz, glass beads, glass bubbles and glass fibers), silicates (e.g., talc, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, carbon black, certain metal oxides (e.g., calcium oxide (lime)), alumina, tin oxide (e.g. stannic oxide), titanium dioxide, metal sulfites (e.g., calcium sulfite), thermoplastic particles (e.g., polycarbonate, polyetherimide, polyester, polyethylene, polysulfone, polystyrene, acrylonitrile-butadiene-styrene block copolymer, polypropylene, acetal polymers, polyurethanes, and nylon particles) and thermosetting particles (e.g., phenolic, phenolic, polyurethane). The particles can be in a variety of forms including granules, beads, bubbles, foam, whiskers and combinations of any two or more thereof.

Other additives may be added to the sealant composition or the self-repairing inflatable article in general. Additives that can be added to improve the heat resistance of the sealant composition include, e.g., cyclic organic sulfates, sulfites, sulfoxides, sulfinates (e.g., 2-oxo-1,3,2-dioxathiolanes), hydroquinone, and antioxidants (e.g., phenolic antioxidants such as butylated hydroxyanisole (i.e., BHA or tert-butyl-4-hydroxyanisole) and butylated hydroxytoluene (i.e., BHT or 2,6-di-tert-butyl-p-cresol)). Antioxidants that may be employed include those available under the IRGANOX family of trade designations from BASF Chemical Company (Germany). Additives such as these may be present at about 1-10 wt %, i.e. about 2, about 3, about 4, about 5, about 6, about 7, about 8, about 9, or about 10 wt % in the composition, or in ranges between/including any two of the foregoing values.

Other additives could be added to the sealant composition to provide additional or alternate characteristics including increasing the shelf life of the sealant composition (e.g., sulfur), increasing the plasticity of the composition, changing the color of the sealant composition upon reaction, thickeners, anti-corrosion agents, surfactants, and biocides. For example, dyes or color changing indicators could be added to the sealant composition. These include food colors, bromocresol purple, bromocresol green, bromothymol blue, sulforhodamine B, and cyanoacrylates that can indicate that it has reacted by a color change.

The sealant composition can also include additives that increase the pressure within the sealed package, thereby increasing the rate at which the sealant composition is pushed out of the sealed flexible package. Examples of such additives include triacetone triperoxide, butane, and combinations thereof.

Inflatable articles of the present technology include tires such as bicycle, motorcycle, car, trailer or truck tires. In some embodiments, the tire includes a tire casing having an interior surface and an exterior surface, an inner tube having an interior surface and an exterior surface, wherein the flexible package is disposed between the interior surface of the tire casing and the exterior surface of the inner tube. Such tires may include any of the inflatable components and flexible sealed packages disclosed herein. The present technology further provides wheels that include any of the tires disclosed herein.

The self-repairing inflatable article optionally includes an attachment adhesive disposed on at least one surface of the sealed flexible package, a release liner covering the positioning adhesive, and combinations thereof. The attachment adhesive is selected to enable the package to be adhered to a surface of the elastomeric article. The attachment adhesive can permanently bond the repair system to the elastomeric article or temporarily bond the repair system to the elastomeric article. Suitable attachment adhesives include, e.g., pressure sensitive adhesives, repositionable adhesives, thermosetting adhesives, rubber cement, and combinations of any two or more thereof. In uses where the elastomeric article will experience relatively high temperatures during use, the attachment adhesive is selected such that it retains its ability to adhere the flexible package to the elastomeric article at such temperatures. In some embodiments the attachment adhesive includes mixtures of styrene-butadiene copolymer, heptane and polymerizable olefin resin (e.g., LIQUID NAILS).

Alternatively, the self-repairing inflatable article optionally includes a mechanical attachment mechanism that enables the repair system to be affixed to the elastomeric component. One useful mechanism is a two component tongue and groove assembly (e.g., a ZIPLOC assembly). The flexible package can include a first component of the two component assembly (e.g., the tongue or the groove) and the elastomeric component can include the second component of the two component assembly (e.g., the tongue or the groove). In other embodiments, the sealed flexible package is attached to the elastomeric component with staples, nails, stitching, and combinations of two or more thereof.

In inflatable articles that include an inner tube, the sealed flexible package can be positioned between the inner tube and the inflatable component, e.g., a rubber tire casing, and the pressure exerted by the inflated inner tube against the package and the inflatable component can maintain the repair system in position within the article.

The inflatable article optionally includes an additional layer positioned near the sealed flexible package. The layer can be on one major surface (e.g., an exterior surface) of the package, on two major surfaces of the package, surrounding the package (e.g., enveloping the package), and combinations thereof. The layer can provide reinforcement to a sealed puncture in the article. In practice, the layer can be positioned such that when the article is punctured, the sealant composition seals the puncture and the additional layer adheres to the inflatable component through the sealant composition thereby adding a reinforcing layer to the area near the sealed puncture.

The layer can be in a variety of forms including, e.g., a continuous sheet, a discontinuous sheet, a woven web and a nonwoven web. In some embodiments, the additional layer is a fiber weave that acts as a self-reinforcing mechanism that stops bullets upon a ballistic impact. The layer can be made from the elastomers, the thermoplastic polymers, and thermoset polymers set forth above. Woven and nonwoven webs are made from a variety of materials including, e.g., cotton, polyester, carbon, glass, polyolefin (e.g., polyolefin polymers (homopolymer, copolymers, and terpolymers) prepared from olefin monomers including, e.g., propylene, ethylene, butene, hexene, octene, and combinations thereof), polyvinyl acetate, butyl acrylate, ethylene vinyl acetate, polyamides (e.g., nylon), vinyl, p-phenylene terephthalamides, poly-metaphenylene isophthalamides, and combinations of any two or more thereof. The materials from which the webs can be made can be in a variety of forms including, e.g., fiber, yarns, thread, and combinations of any two or more thereof. Useful para-amide fibers include, e.g., p-phenylene terephthalamides, poly-metaphenylene isophthalamides, and combinations thereof.

Thus, in some embodiments, the inflatable article includes a ballistic grade woven web protecting the inflatable component, in whole or in part. For example, the ballistic grade woven web may surround the inflatable component. The ballistic grade woven web may include at least one of fiberglass, nylon fibers, polypropylene fibers, metal fibers, inerga fibers, tegris fibers, para-amide fibers meta-amide fibers, or polyparaphenylene terephthalamide fibers.

The sealed flexible package is relatively light weight and can be combined with other systems including, e.g., conventional run flat tire configurations, combined with polyurethane solid tires, combined with tires made from ballistic materials including fibers such as Kevlar or Dyneema, steel and stainless steel and combinations thereof.

The sealed flexible package also can be a component of a larger system, e.g., an inflation system such as a central tire inflation system (i.e., CTIS) are a self-inflation system, a pressurized gas component, a self-foaming system (e.g., systems in which polyurethane fills the tires with the aid of a CTIS system), a system that include a self-sealing layer of gel positioned on the inside of the tire or a layer of pliable rubber that is positioned on the inside of the tire that does not flow, and combinations thereof. With respect to a central tire inflation system, for example, the central tire inflation system can be in fluid communication with the inflatable, elastomeric article such that when a puncture occurs, activation of the central tire inflation system can perform a variety of functions including, e.g., transmitting gas (e.g., air) to the inflatable elastomeric article, facilitating delivery of the sealant composition to the hole created by the puncture, and combinations thereof.

Other inflation systems can include a container that includes a pressure gas, e.g., a vapor pressure pump. When a puncture in the elastomeric article occurs, the pressurized gas is released and expands and forces the sealant composition toward the hole.

The sealed flexible package can be combined with the inflatable component in a variety of configurations. In one embodiment, the self-repairing, inflatable article is in the form of a rubber tire positioned on a wheel rim, and the sealed flexible package in the form of a strip of sealed flexible packages is affixed to the interior surface of the tire, through an adhesive composition. The flexible packages are positioned along the side walls of the tire. A sealant composition 16 is sealed within the flexible packages. The sealed flexible packages include a number of cells separated by septa, filled with the sealant composition, and sealed off from one another such that they are not in fluid communication with one another.

The sealed flexible packages include two layers of a film-foil laminate sealed together at edges and lands 26 located within the flexible package 22 to form multiple sealed cells 24 that are sealed off from one another and that enclose the sealant composition. The layers can be a single sheet (e.g., folded over upon itself and continuous tubing) or two separate layers.

In another embodiment, a series of woven webs of KEVLAR fibers are positioned between the sealed flexible package and the interior surface of a tire. The sealed package includes a number of seals positioned apart from one another, so as to partition the sealed package into segments that include at least one chamber in which a sealant composition is disposed.

In other embodiments, the inflatable article includes a series of woven webs of KEVLAR fibers are positioned on the exterior surface of the sealed flexible package opposite the surface of the sealed package that is affixed to the interior surface of the tire.

In another embodiment, the inflatable article includes a sealed flexible package disposed between a solid support and the interior surface of a rubber tire of a run flat tire including along the interior surface of the side walls and the tread of the tire.

In another embodiment, the inflatable elastomeric article is in the form of a bike tire that includes a casing. The bead of the casing is attached to a wheel rim. The casing defines a volume in which an inner tube that is filled with air is positioned. The tire also includes a tire tread and a valve stem through which the inner tube is filled with pressurized air. A repair system that includes a sealed package is positioned between to the interior surface of the casing and the exterior surface of the inner tube.

In other embodiments, the inflatable elastomeric article is in the form of a bladder that includes side walls that define a volume that is filled with fuel or some other gas, through a sealable opening, and a sealed flexible package is affixed to the interior surface of a side wall of the article.

In other embodiments, a repair system that includes sealed flexible package in the form of hollow fibers that are filled with a sealant composition. The hollow fibers are woven into the weave of a woven web of fibers (e.g., KEVLAR fibers).

The invention will now be described by way of the following examples. All parts, ratios, percents and amounts stated in the Examples are by weight unless otherwise specified.

EXAMPLES

General Procedures

General procedures used in the Examples include the following. All ratios and percentages are by weight unless otherwise indicated.

Preparation of Sealant Composition 1

A sealant composition is prepared by combining 60-80 wt % ethyl-2-cyanoacrylate, 2 wt % hydroquinone, 7.8 wt % BHT and 10-30 wt % 2 ethyl hexyl methacrylate, with mixing under nitrogen. Optionally, Preparation of Sealant Composition 2

20 volume % natural rubber whiskers approximately ¼ inch×¹⁄₁₆ inch×¹⁄₁₆ were added to Sealant Composition 1 to provide Sealant Composition 2.

Preparation of Sealant Composition 3

REMA TIP TOP cold vulcanizing fluid (includes trichloroethylene as base solvent) from Rema Tip Top North America (Northvale, N.J.) was used without further modification as Sealant Composition 3.

Preparation of Sealant Composition 4

20 volume % whiskers of uncured natural rubber approximately ¼ inch×¹⁄₁₆ inch×¹⁄₁₆ were added to REMA TIP TOP cold vulcanizing fluid to provide Sealant Composition 4.

Preparation of Sealant Composition 5

20 volume % whiskers of uncured natural rubber approximately ¼ inch×¹⁄₁₆ inch×¹⁄₁₆ were added to rubber cement to provide Sealant Composition 5. The whiskers dissolved in the rubber cement over time.

Acid Treatment

The interior surface of a metal foil or the metalized surface of a metalized film was treated with acid by contacting the metal surface with an aqueous solution of 5% acetic acid and allowing the treated surface to air dry.

Sealed Flexible Package Preparation

A tube of multilayer film having a polyester (48 gauge) and aluminum film layer (0.000285 inches) and a 6 mil polyethylene film layer laminated together, optionally acid treated, and filled with a sealant composition and the two open ends of the tube are thermally sealed. The seals were about ⅛" wide. The polyethylene layer may be 2 mil thick.

Examples 1-5

A sealed flexible package was placed between the rubber casing and the inner tube of a number of bike tires. The sealed packages were constructed according to the General Procedures and were filled with the sealant composition indicated below in Table 1. The tires were inflated to a pressure of about 60 psi, and punctured. The tires were left overnight. The next day they were observed and the tire pressure was measured. The results are reported in Table 1.

TABLE 1

| Sample | Package Construction | Sealant Composition | Results |
|---|---|---|---|
| Example 1 | PE[1] | PB[3] 731 | Slight Air Loss. Tire was still pressurized the next day. |
| Example 2 | PE | PB 737 with PB 2011 gel | Air loss. Tire was still pressurized the next day. |
| Example 3 | PE | PB 735 | Little air loss. Tire still pressurized the next day. |
| Example 4 | PE | PB 735 | Tire bubbled a little and held air overnight. |
| Example 5 | MF[2] | PACER HP-10 | Sealant shot out and foamed slightly. The tire held air overnight. |

[1] 6 mil polyethylene tubing sealed at both ends
[2] multilayer 6 mil metalized polyethylene film tubing sealed at both ends
[3] PERMABOND Example 6—Self-Repairing Bike Tire A sealed flexible package (about 2 cm×6 cm) having a multilayer design (polyester/aluminum foil/polyethylene) was acid treated, filled with Sealant Composition 1, and then sealed as described above in the General Procedures. The sealed package was then placed between a bike tire and its inner tube and the tire was pressurized to about 60 psi. A bicycle equipped with the self-repairing tire was ridden over a nail approximately six times with a period of one month occurring between each time. Repair of the hole was effected within a few seconds each time and the tire remained pressurized without any addition of air. The bike was ridden on surface streets after each self-repair without failure of the repair. Upon removing the tire from the bike wheel, the sealed flexible packages were observed to be intact.

Example 7—Self-Repairing Bicycle Tire with Multi-Cell Sealed Flexible Package

A flexible thin polymer film/metal foil/polymer film (polyester/aluminum/polyethylene) package was filled with Sealant Composition 1 and sealed in multiple locations such that the flexible package included four individually sealed cells. The package was adhered to the interior surface of a bicycle tire with rubber cement. An inner tube was inserted in the tire such that the flexible package was positioned between the tire and the inner tube. The tire was mounted on a wheel rim. Tire and inner tube were then punctured with an ice pick, which also punctured the package. The sealant composition flowed out of the package and repaired the damage to the tire and inner tube. The tires were repaired within a period of one second. There was minimal loss of air pressure in the first two hours. The wheels with the self-repaired tires were mounted on a bike and ridden on surface streets. There was minimal additional loss of air pressure over a period of one week.

Multiple puncture tests were conducted by riding a bike equipped with the self-repairing tires over a nail in a board or using an ice pick. It was observed that the puncture device (e.g., an ice pick or a nail) could be left in or removed from the tire and the repair system repaired the damage, repair occurred when the inner tube was pressurized and when the inner tube was not pressurized, and repair occurred when a heavyweight rider was riding on the tires over a nail bed and gravel.

Example 8—Self-Repairing Truck Tires with Inner Tubes

Two truck tires were tested according to a test designed to simulate a foreign object being lodged in the tire and then being dislodged, thereby creating a puncture in the inner tube of the tire. Each tire had a tire casing, which included a tread, and an inner tube and the initial tire pressure when mounted on a wheel was 30.5 psi and 27.5 psi, for the first and second tires, respectively. A sealed package that included Sealant Composition 2 or 4 was positioned between the interior surface of the tire casing and the inner tube of each tire. The tire was punctured with a hooked dental pick which was left in place for two hours and then removed. No tire pressure was lost over the two hour period, and no air was felt or heard leaving the assembly during repair.

The hooked pick was then removed. The sealant composition of the repair system appeared to react with the material of the tire to seal the puncture. The final tire pressure, i.e., after removal of the hook and simultaneous sealing of the puncture, was 27.5 psi and 24.5 psi, respectively, for the two tires.

One of the tires was then observed over a one week period (not mounted on a truck) and the tire pressure was checked throughout this time. After one week the tire pressure was not significantly different that the initial measured pressure: the initial post puncture tire pressure was 27.5 psi, and the final tire pressure after one week was 24.5 psi.

Example 9

A sealed flexible package that included a sealant composition was affixed to the interior surface of an un-inflated bike tire. The un-inflated tire was then punctured twice and each time the sealant composition flowed into the puncture and repaired the puncture. The pressure after puncture and inflation and the observation regarding inflation are set forth below in Table 2.

TABLE 2

| Puncture No. | Psi after inflation | Stayed Inflated? |
|---|---|---|
| 1 | 37.5 | Y |
| 2 | 32 | Y |

The assembly was taken apart and the inner tube was observed to have bonded to the tire. The repaired tire was then inflated and ridden on gravel Example 10—Self-Repairing Bicycle Tire An inflated bicycle tire that included a sealed flexible package of Example 6 was punctured by riding the bike over a series of nails sticking out of a board. The bike was ridden around on the street to see if particulates would attach to the tire. The tire repaired itself during testing. There was some dirt and small particulates on the repaired area but nothing significant enough to affect the ability to ride the bicycle. The initial tire pressure was 47.5 psi. The tire pressure after puncture and repair was 40.5 psi, and after one week the tire pressure was 39 psi.

Example 11—Self-Repairing Automobile Tire

A sealed flexible package constructed of a multilayer aluminum foil/polymer film filled with Sealant Composition 3 or 4 was constructed according to the General Procedures. The sealed flexible package was adhered to the interior surface of an automobile tire, including the sidewalls, with LIQUID NAILS HOME PROJECTS adhesive (Akzo Nobel, Strongsville, Ohio). The tire was mounted on a rim and then inflated to about 35 to 40 psi. Holes were then poked into the tire with a nail. The air pressure of the tire did not decrease over a period of at least one month.

Example 12

A sealed flexible package with multiple cells or slender tubes are placed in layers of ballistic grade cloth or woven into the weave of ballistic grade cloth. It is expected that when a tire is punctured by a relatively higher energy impact than that which results from a nail, the cloth will contain some of the flow of the sealant composition allowing for many repairs cell and per flexible package.

Example 13—M-ATV

Different repair systems are affixed to a series of M-ATV tire without run flat, mounted on a wheel, are inflated to the pressure limit and loaded to 10,000 pounds on a universal testing machine. The tires are shot with a 44 magnum semiwadcutter ammunition or with fragment simulating bullets through a chronograph and the pressure loss and time to deflation is measured.

A first tire includes a repair system that includes segmented sealed flexible packages filled with a sealant composition.

A second tire includes a repair system that includes breakable flexible glass fibers filled with a sealant composition.

A third tire includes a repair system that includes segmented sealed flexible packages filled with a sealant composition and a ballistic weave positioned on the surface of the flexible package opposite the surface of the rubber tire.

A fourth tire includes segmented sealed flexible packages filled with a sealant composition and a portion of a CTIS system.

The tires are shot and allowed to repair and then shot a second time and allowed to repair. The tires are expected to retain at least 90% of their initial tire pressure.

Example 14—Self-Repairing Truck Tire

Sealed flexible packages (2"×4") were prepared and filled with about 40 mL Sealant Composition 4 according to the General Procedures. The sealed flexible packages were placed on the interior surface of a side wall of a truck tire (15 inch radius), the tire was set on a rim, and inflated to 27.5 psi. The wheel was then installed on a truck. The tire was then punctured in the area of the sealed flexible package and the tire pressure was measured at half minute intervals over the next three minutes and then periodically thereafter. The results are set forth in Table 3 below.

TABLE 3

| Elapsed Time | Pressure (psi) |
| --- | --- |
| 0 | 27.5 |
| 0.5 minutes | 27.5 |
| 1 minute | 27.5 |

TABLE 3-continued

| Elapsed Time | Pressure (psi) |
| --- | --- |
| 1.5 minutes | 27.0 |
| 2 minutes | 27.0 |
| 2.5 minutes | 27.0 |
| 3 minutes | 27.0 |
| 3 days | 27.5 |
| 4 days | 26.5 |
| 6 days | 26.0 |
| 8 days | 26.0 |
| 11 days | 26.5 |
| 23 days | 26.0 |
| 26 days | 25 |

Note:
Every time the tire was tested a jet of air is released from the tire. No correction was made for this air loss.

Comparative Example

SLIME tire repair composition was placed on the interior surface of a side wall of a vehicle tire, the tire was mounted on a rim, and inflated to 27.5 psi. The wheel was then installed on a truck.

A self-repairing truck tire prepared according to Example 14 and the tire containing SLIME were then punctured in the area of the sealed flexible package and the SLIME respectively and the tire pressure was measured at 0 minutes (min), one minute and three minutes. The results are set forth in Table 4 below.

TABLE 4

| Time (min) | Example 14 Pressure (psi) | SLIME Pressure (psi) |
| --- | --- | --- |
| 0 | 27.5 | 27.5 |
| 1 | 27.5 | 27.5 |
| 3 | 27.5 | 27.5 |

The self-repairing truck tire was then driven on for approximately 2.5 miles on city streets at an average of 30 miles per hour. The tire pressure was checked after the drive and was found to be 27.5 psi.

An attempt was made to drive with the tire prepared with SLIME. As soon as the truck started moving, the tire started losing pressure and SLIME squirted out of the puncture hole. In the short period of time, the tire lost 3 psi of pressure.

Other embodiments are within the claims. Although the elastomeric article has been described with respect to inflatable elastomeric articles, in other embodiments, the elastomeric article is other than inflatable including, e.g., an elastomeric substrate, and the flexible package is affixed to the elastomeric substrate. When the integrity of the elastomeric substrate is altered, e.g., through tearing, ripping, shredding, the alteration also alters the flexible package allowing the flexible package to release the reactive chemical. The reactive chemical then contacts the elastomeric substrate and repairs the tear, rip or shred so as to at least partially restore the integrity of the elastomeric article.

What is claimed is:
1. A self-repairing structure comprising
a pressurized component; and
a sealed flexible package, comprising one or more sealed cells, wherein
the package or each cell comprises
a first sheet with one or more edges;
a second sheet with one or more edges;

a sealant composition disposed between the first and second sheets; and the first and second sheets sealed to each other at the one or more edges, where each sheet is a laminate having a top layer of polyester, an adhering layer of polyethylene, a metal foil and a second layer of polyethylene which forms the internal surface of the package; and wherein the sealed flexible package is configured to release the sealant composition upon puncture of the pressurized component.

2. The self-repairing structure of claim 1 wherein the structure is a tent or building.

3. The self-repairing structure of claim 1, wherein the structure is supported by a dome, air-frame, inflatable arch or an air beam.

4. The self-repairing structure of claim 1, wherein the structure comprises a woven web or cloth or weave comprising at least one of fiberglass, nylon fibers, polypropylene fibers, metal fibers, carbon fibers, inerga fibers, tegris fibers, para-amide fibers meta-amide fibers, or polyparaphenylene terephthalamide fibers.

5. The self-repairing structure of claim 1 wherein the metal foil comprises aluminum, tin, steel or an alloy of any one of the foregoing.

6. The self-repairing structure of claim 1 wherein the metal foil comprises aluminum.

7. The self-repairing structure of claim 1 wherein an interior surface of the sealed flexible package is an acid-treated surface.

8. The self-repairing structure of claim 1 wherein the sealant composition comprises one or more of cyanoacrylate, one-part epoxy, polymerizable monomers, polymerizable oligomers, polyurethane, latex, rubber cement, and cold vulcanizing fluid with rubber or asphalt particles or whiskers.

9. The self-repairing structure of claim 1 wherein the sealant composition comprises pieces or particles of rubber, other elastomers, carbon black, asphalt or bitumen.

10. The self-repairing structure of claim 9 wherein the sealant composition comprises an organic solvent.

11. The self-repairing structure of claim 10 wherein the organic solvent is selected from the group consisting of ethyl ether, acetone, n-heptane, n-hexane, toluene, acetone, glycerol, methyl ethyl ketone, methyl isobutyl ketone, methylene chloride, ethylene dichloride, pyridine, isooctane, chloroform, carbon tetrachloride, o-xylene, trichloroethylene, dimethyl sulfoxide and combinations of any two or more thereof.

12. The self-repairing structure of claim 10 wherein the organic solvent comprises n-hexane and/or n-heptane.

13. The self-repairing structure of claim 10, wherein the sealant composition comprises one or more of an acrylate, alkyl acrylate, methylmethacrylate, cyanoacrylate, acrylic acid, alkyl acrylic acid, olefin, lactone, lactam, styrene, isoprene, butadiene, urethane, amines, silicone-carbon resins, dicyclopentadiene (DCPD) and epoxy.

14. The self-repairing structure of claim 9 wherein the sealant composition comprises vulcanizing fluid, one or two organic solvents with a boiling point of at least about 75° C. and whiskers of uncured rubber or particles of asphalt or bitumen.

15. The self-repairing structure of claim 1, wherein the sealant composition comprises one or more of an acrylate, alkyl acrylate, methylmethacrylate, cyanoacrylate, acrylic acid, alkyl acrylic acid, olefin, lactone, lactam, styrene, isoprene, butadiene, urethane, siloxane, amine, silicone-carbon resin, dicyclopentadiene (DCPD) and epoxy.

16. The self-repairing structure of claim 1 wherein the sealant composition comprises one or more of ethyl 2-cyanoacrylate, methyl 2-cyanoacrylate, n-butyl cyanoacrylate, 2-octyl cyanoacrylate, alkyl (meth)acrylate, rubber latex, rubber cement, and cold vulcanizing fluid.

17. The self-repairing structure of claim 16 wherein the sealant composition comprises cold vulcanizing fluid and the cold vulcanizing fluid comprises trichloroethylene.

18. The self-repairing structure of claim 1 wherein the sealant composition comprises a chemical capable of chemically bonding to an elastomeric polymer.

19. The self-repairing structure of claim 1, wherein the sealant composition remains active even when heated to at least 125° C.

20. The self-repairing structure of claim 1, wherein the sealant composition comprises heat-resistant additives and shelf life increasing additives.

21. The self-repairing structure of claim 1, wherein the sealant composition comprises rubber latex.

22. The self-repairing structure of claim 21, wherein the amount of rubber, other elastomers, carbon black, bitumen, or asphalt range up to about 75% by weight of the sealant composition.

23. A self-repairing pressurized structure comprising
a sealed flexible package, comprising one or more sealed cells, wherein
the package or each cell comprises
a first sheet with one or more edges;
a second sheet with one or more edges;
a sealant composition disposed between the first and second sheets; and
the first and second sheets sealed to each other at the one or more edges, where each sheet is a laminate having a top layer of polyester, an adhering layer of polyethylene, a metal foil and a second layer of polyethylene which forms the internal surface of the package; and
wherein the sealed flexible package is configured to release the sealant composition upon puncture of the pressurized structure.

24. The self-repairing pressurized structure of claim 1, wherein the self-repairing structure is a tire, dome, airframe, inflatable arch or an air beam.

25. A self-repairing pressurized structure comprising:
a sealed flexible package, and
a sealant composition disposed in the sealed flexible package,
wherein the sealed flexible package comprises one or more sealed cells, and the package or each cell comprises:
a single sheet having one or more edges, wherein the sheet is folded over on itself and sealed where the edges meet;
the sealant composition disposed within the folded sheet; and
the sheet is a laminate having a top layer of polyester, an adhering layer of polyethylene, a metal foil and a second layer of polyethylene which forms the internal surface of the package; and
the sealed flexible package is configured to release the sealant composition upon puncture of the pressurized structure.

* * * * *